United States Patent
Ley et al.

(10) Patent No.: US 12,456,892 B2
(45) Date of Patent: Oct. 28, 2025

(54) ELECTRIC MOTOR HAVING HIGH STRENGTH ROTOR WITH RING MAGNET

(71) Applicant: Nidec Motor Corporation, St. Louis, MO (US)

(72) Inventors: Bruce Ley, Ossian, IN (US); Michael Coles, Manlius, NY (US); Hunter Gill, Uniontown, OH (US); Mike Alivero, Syracuse, NY (US); Joe Engle, Uniontown, OH (US); Kyle Chesnut, Fort Wayne, IN (US); Tillian Jones, Syracuse, NY (US); Jeremy Beck, Fort Wayne, IN (US)

(73) Assignee: Nidec Motor Corporation, St. Louis, MO (US)

( * ) Notice: Subject to any disclaimer, the term of this patent is extended or adjusted under 35 U.S.C. 154(b) by 202 days.

(21) Appl. No.: 18/489,644

(22) Filed: Oct. 18, 2023

(65) Prior Publication Data

US 2024/0136875 A1  Apr. 25, 2024
US 2024/0235297 A9  Jul. 11, 2024

Related U.S. Application Data

(60) Provisional application No. 63/380,193, filed on Oct. 19, 2022.

(51) Int. Cl.
*H02K 1/2793* (2022.01)
*H02K 1/18* (2006.01)
*H02K 1/28* (2006.01)
*H02K 7/00* (2006.01)

(52) U.S. Cl.
CPC ........... *H02K 1/2793* (2013.01); *H02K 1/182* (2013.01); *H02K 1/28* (2013.01); *H02K 7/003* (2013.01); *H02K 2201/03* (2013.01)

(58) Field of Classification Search
CPC ............ H02K 1/2793; H02K 2201/03; H02K 1/2795; H02K 1/28; H02K 5/15; H02K 5/1732; H02K 7/003; H02K 1/182; H02K 11/215; H02K 21/24; H02K 2211/03
See application file for complete search history.

(56) References Cited

U.S. PATENT DOCUMENTS

| | | | |
|---|---|---|---|
| 2002/0195894 A1* | 12/2002 | Tokunaga | F16C 17/105 310/90 |
| 2003/0031114 A1* | 2/2003 | Noda | F16C 17/107 310/90 |
| 2007/0188033 A1* | 8/2007 | Hada | F16C 17/107 310/90 |
| 2010/0072850 A1* | 3/2010 | Miyata | H02K 16/02 310/156.12 |
| 2012/0187787 A1* | 7/2012 | Saito | H02K 21/24 310/83 |
| 2014/0042859 A1* | 2/2014 | Wang | H02K 21/24 310/156.32 |
| 2017/0256999 A1* | 9/2017 | Turner | H02K 21/24 |
| 2018/0278133 A1* | 9/2018 | Blevins | H02K 5/225 |

FOREIGN PATENT DOCUMENTS

CN  214756013 U  * 11/2021

* cited by examiner

*Primary Examiner* — Dominick L Plakkoottam
(74) *Attorney, Agent, or Firm* — Hovey Williams LLP

(57) ABSTRACT

An electric motor includes a stator and a rotor rotatable relative to the stator. The rotor includes an axial shaft, a disc projecting radially from the shaft, and a ring magnet affixed to the disc. The shaft and the disc are integrally formed as a unitary body.

17 Claims, 8 Drawing Sheets

ELECTRIC MOTOR HAVING HIGH STRENGTH ROTOR WITH RING MAGNET

CROSS-REFERENCE TO RELATED APPLICATION

1. Priority Application
2. The present application claims the benefit of and priority from U.S. Provisional Patent Application No. 63/380,193 filed Oct. 19, 2022, the entire disclosure of which is hereby incorporated by reference herein.

BACKGROUND OF THE INVENTION

1. Field of the Invention

The embodiments described herein relate generally to an electric motor. More particularly, embodiments of the present invention concern electric motors having a high strength rotor assembly with a ring magnet.

2. Discussion of the Prior Art

Electric motors have been commonly used for low-power applications. More recently, electric motors have been of interest for higher power applications. When used for high power applications, electric motors need to be able to withstand "hard stop" events. For example, high power applications of electric motors, such as electric vehicles, lawn mowers, and power tools, cannot have parts dislodged or create projectiles when the rotor is brought to an abrupt stop. It is also desirable for axial flux motors to withstand these harsh operating conditions.

SUMMARY

According to one aspect of the present invention, an electric motor includes a stator and a rotor rotatable relative to the stator. The rotor includes an axial shaft, a disc projecting radially from the shaft, and a ring magnet affixed to the disc. The shaft and the disc are integrally formed as a unitary body.

This summary is provided to introduce a selection of concepts in a simplified form. These concepts are further described below in the detailed description of the preferred embodiments.

Various other aspects and advantages of the present invention will be apparent from the following detailed description of the preferred embodiments and the accompanying drawing figures.

BRIEF DESCRIPTION OF THE DRAWINGS

Preferred embodiments of the present invention are described in detail below with references to the attached drawing figures, wherein.

Figure 1:
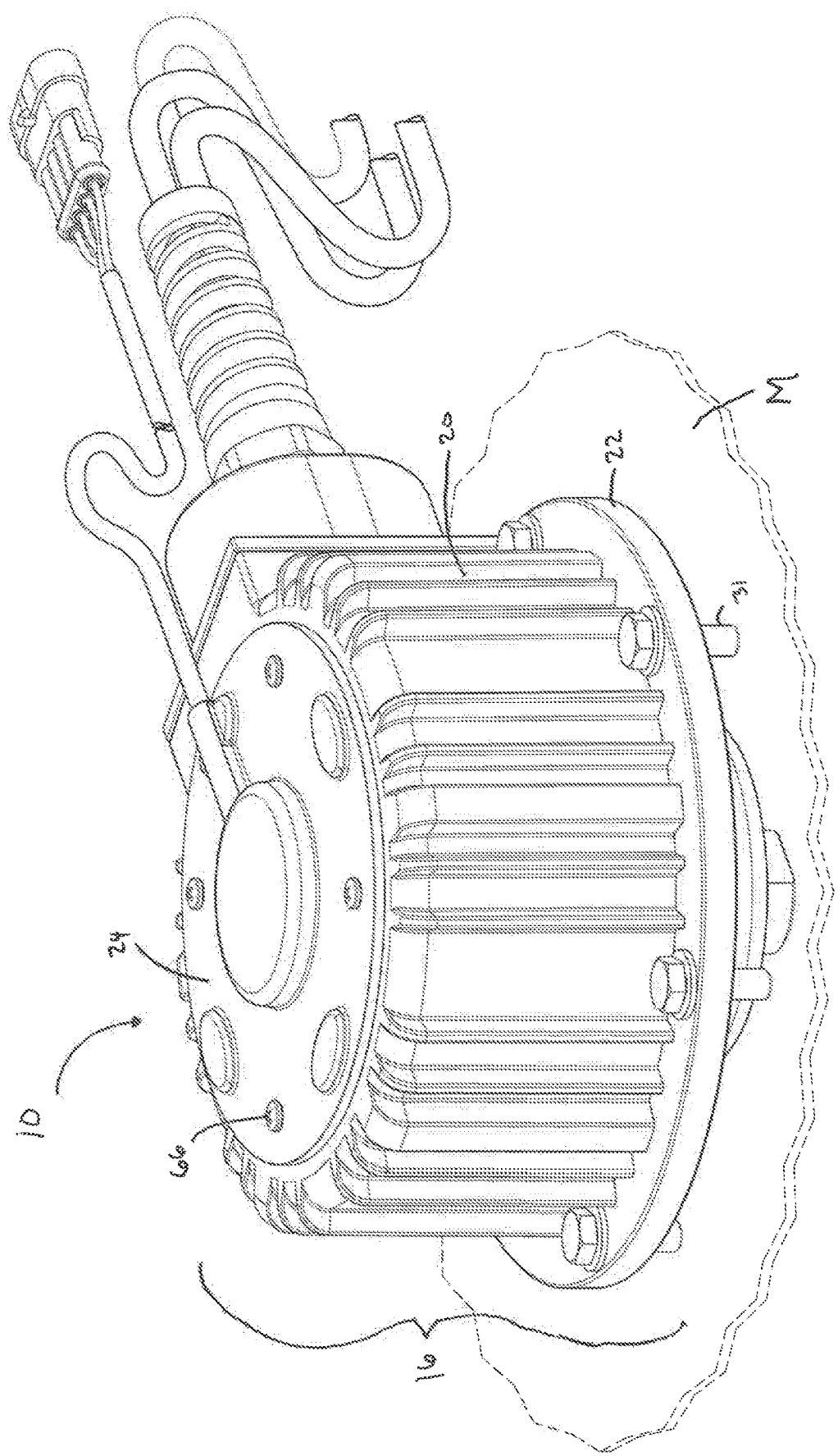
FIG. 1 is a perspective view of an electric motor in accordance with a preferred embodiment of the present invention.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (such as top, bottom, upper, lower, inner, outer, and so on.) are used solely for the sake of convenience and should be understood only in relation to each other. For instance, a component might in practice be oriented such that faces referred to as "top" and "bottom" are sideways, angled, inverted, and so on relative to the chosen frame of reference.

Motor Overview

Figure 2:
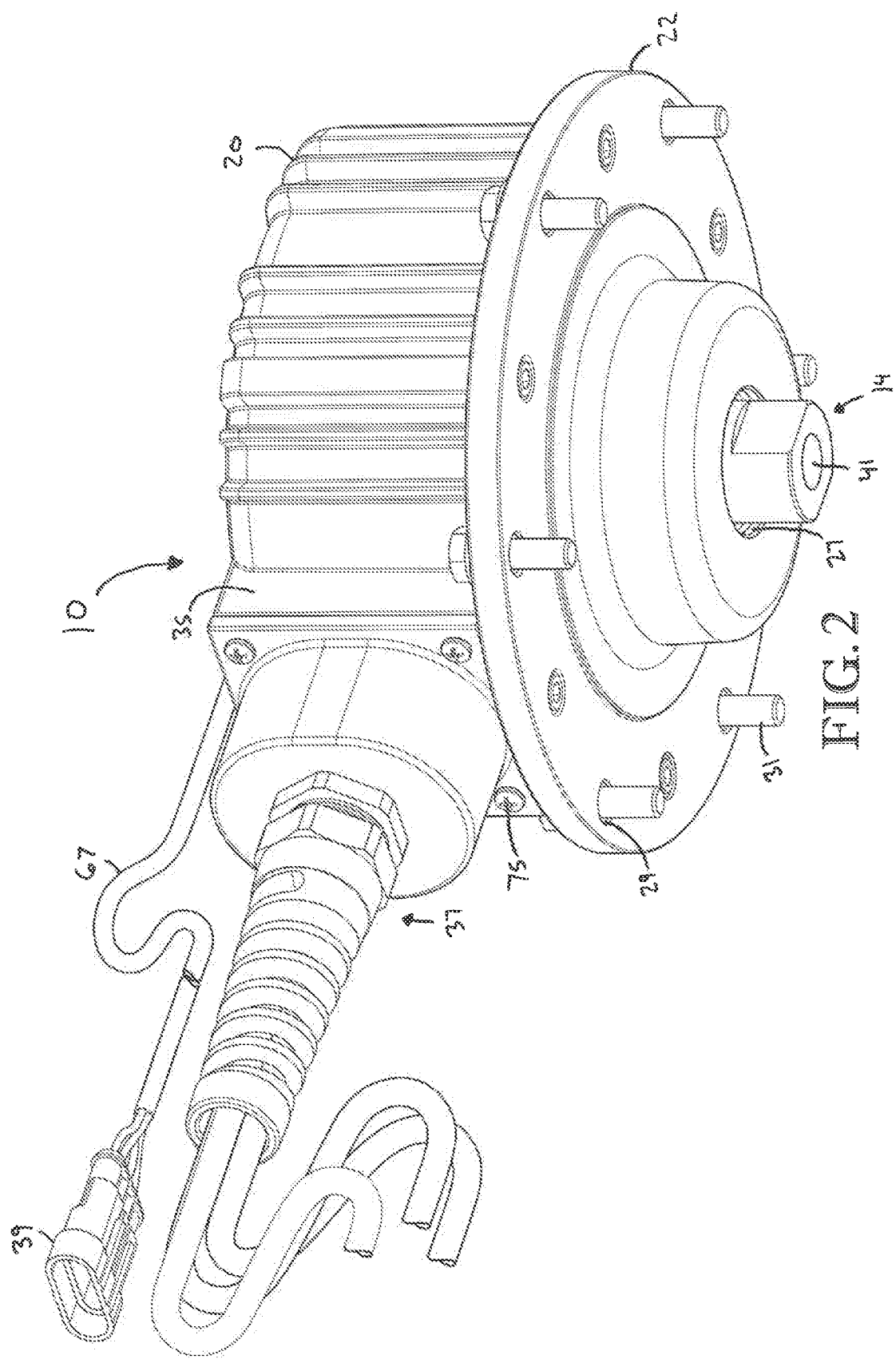
FIG. 2 is an alternate perspective view of the motor of FIG. 1.

FIGS. 1-2 illustrate an electric motor 10 in accordance with a preferred embodiment of the present invention. The motor 10 broadly includes a stator 12 and a rotor 14 (shown in FIG. 4). The rotor 14 rotates relative to the stator 12 about an axis of rotation.

The motor 10 further includes a motor housing 16 and a controller assembly 18. The motor housing 16 includes a main body 20, a base 22, and a cap 24. The housing 16 defines a motor chamber 26 in which the stator 12 and the rotor 14 are at least partly received.

Figure 3:
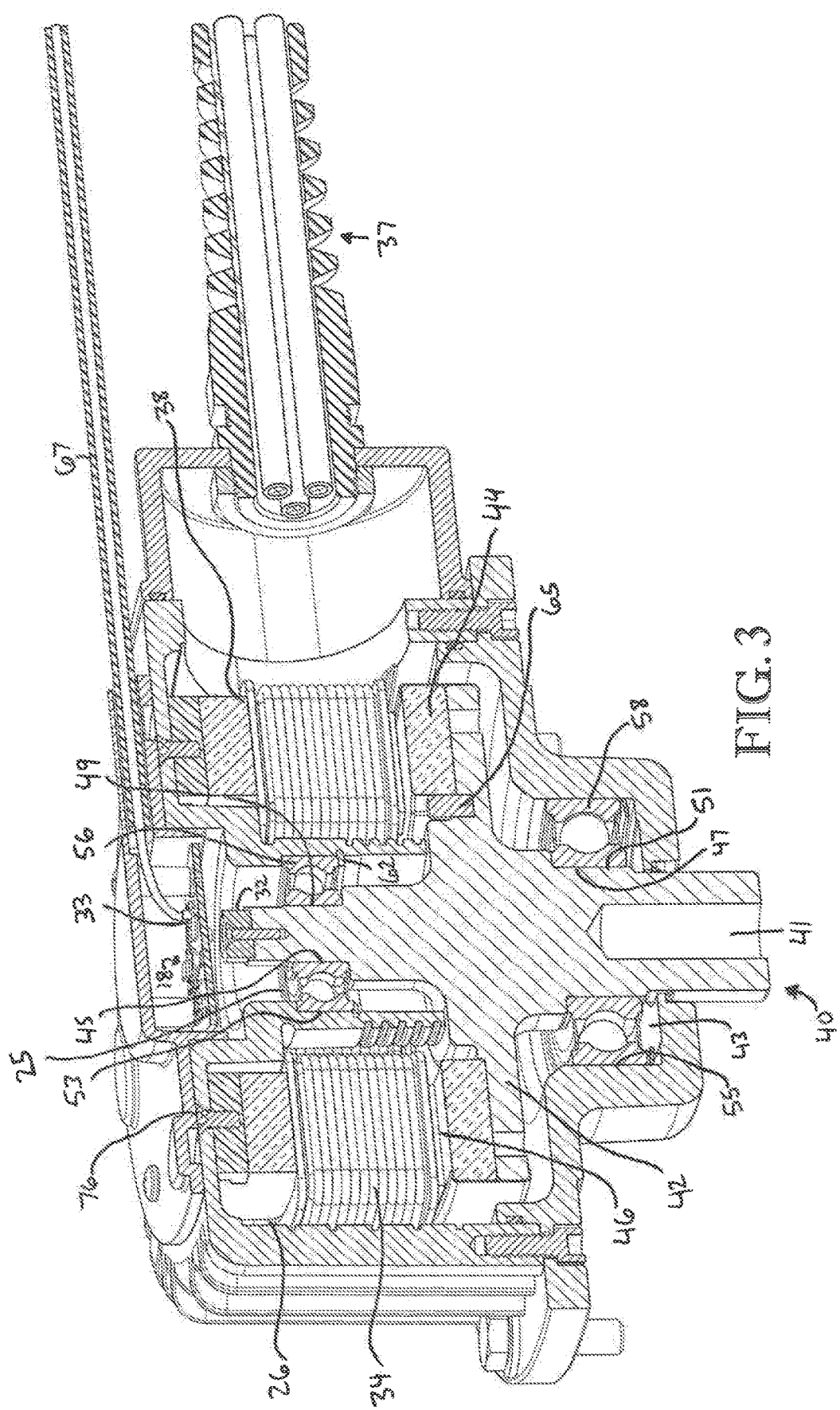
FIG. 3 is a cross-sectional view of the motor of FIG. 1, illustrating the unitary rotor body and the stator.

In the preferred embodiment, the main body 20 is generally cylindrical in shape. The main body 20 preferably presents a flanged outer surface 21 and an inner perimeter 23 (shown in FIG. 6). As best shown in FIG. 3, the inner perimeter 23 defines a pocket 25 for receiving a bearing assembly (described further below). According to some aspects of the present invention, it is contemplated that other housing body shapes and/or configurations may be used.

Figure 6:
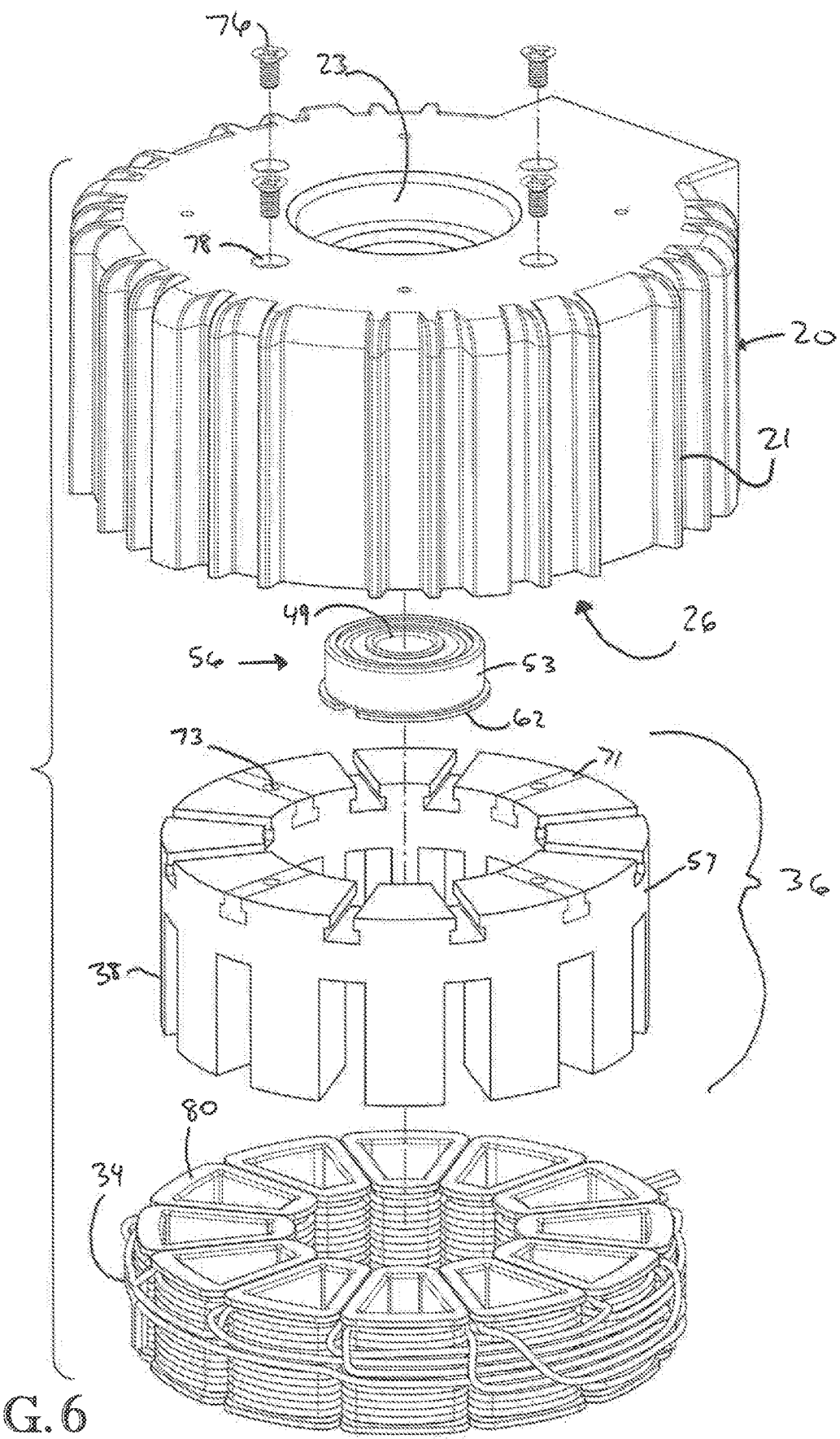
FIG. 6 is an exploded view of the stator and the motor housing cover of the motor of FIG. 1.

As best shown in FIG. 6, the body 20 preferably includes openings 78 for receiving fasteners 76. The openings 78 are preferably threaded. Preferably, the fasteners 76 extend through the openings 78 and secure the body 20 to the stator 12 (described below). However, according to some aspects of the present invention, alternative means for interconnecting the body 20 and the stator 12, such as an adhesive, a snap fit, a bolt, a rivet, and/or any other fastening means are contemplated.

Figure 4:
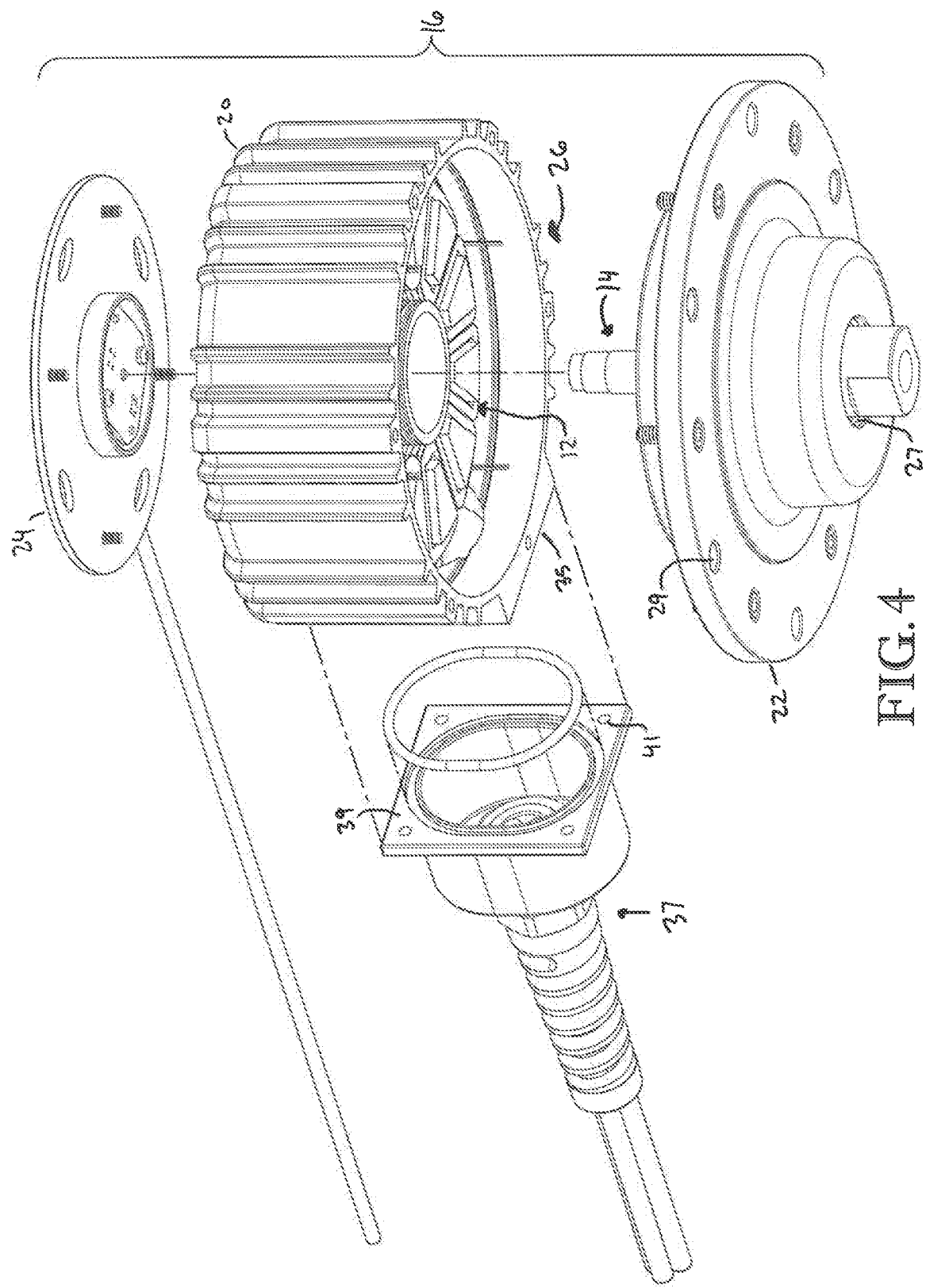
FIG. 4 is an exploded perspective view of the motor of FIG. 1.

In the preferred embodiment, the main body 20 further includes a mount 35 for receiving a power connector 37. As best shown in FIG. 4, the power connector 37 presents a mount-engaging face 39 that includes openings 41 for receiving fasteners 75. The openings 41 are preferably threaded. Preferably, the fasteners 75 are received through the openings 41 and threadably engage the mount 35.

According to some aspects of the present invention, alternative means for interconnecting the power connector 37 and the mount 35, such as an adhesive, a snap fit, a bolt, a rivet, and/or any other fastening means are contemplated.

The motor 10 further includes a power supply (not shown). The power supply may include a battery, capacitor, super-capacitor, and/or any other power supply known to one of ordinary skill in the art. The power connector 37 preferably includes circuitry and wiring for conveying electrical power from the power supply to electrical wiring (described below) of the stator 12.

In the preferred embodiment, the housing base 22 is generally circular in shape. As best shown in FIG. 4, the housing base 22 includes an inner perimeter defining a hole 27, through which at least a portion of the rotor 14 may be received. According to some aspects of the present invention, alternative housing base shapes and/or configurations are contemplated.

In an illustrated embodiment, as best shown in FIG. 2, the housing base 22 includes openings 29 for receiving fasteners 31. Preferably, the fasteners 31 extend through the openings 29 and threadably engage an external component, such as a lawn mower deck M (shown schematically in FIG. 1). According to some aspects of the present invention, alternative means for interconnecting the base 22 and the external component, such as an adhesive, a snap fit, a bolt, a rivet, and/or any other fastening means are contemplated.

As best shown in FIG. 3, the housing base 22 preferably includes an inner surface defining a pocket 43 for receiving a bearing assembly (described below). In the preferred embodiment, best shown in FIG. 7, the housing base 22 includes openings 68 for receiving fasteners 70. Preferably, the fasteners 70 extend through the openings 68 in the base 22 and threadably engage the body 20. However, according to some aspects of the present invention, alternative means for interconnecting the base 22 and the body 20, such as an adhesive, a snap fit, a bolt, a rivet, and/or any other fastening means are contemplated.

Figure 5:
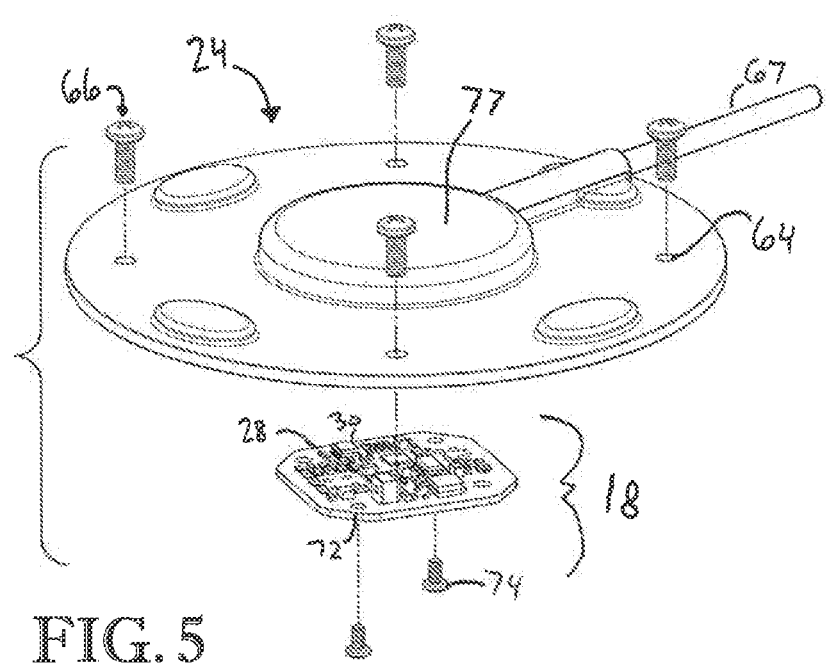
FIG. 5 is an exploded view of the motor housing cap and controller of the motor of FIG. 1.

In the preferred embodiment, the housing cap 24 is generally circular in shape, although other shapes may be used. As best shown in FIGS. 4-5, the cap 24 preferably includes a cover 77 and openings 64 for receiving fasteners 66. The cover 77 is preferably removable for accessing the controller assembly 18 (shown in FIGS. 3 and 5) to facilitate connection of the controller assembly 18 with external electronic circuitry (not shown). In the illustrated embodiment, the fasteners 66 preferably extend through the openings 64 and threadably engage the housing main body 20. According to some aspects of the present invention, it is contemplated that the cap 24 and the body 20 may be interconnected 20 by an alternative means, such as an adhesive, a snap fit, a bolt, a rivet, and/or any other fastening means.

The controller assembly 18 preferably includes electronic components 28 including a sensor 30, and a sensed element 32. The controller assembly 18 is enclosed within the housing 16 by the cap 24 and the main body 20. The electronic components 28 control operation of the motor. The sensed element 32 preferably includes a diametrically magnetized sensor magnet. As will be described further below, the sensor 30 senses rotation of the rotor 14 based on detecting movement of the sensed element 32. According to certain aspects of the present invention, it is permissible for alternative sensing means to be used.

The controller assembly 18 preferably includes electronic components 28 including a sensor 30, and a sensed element 32. The controller assembly 18 is enclosed within the housing 16 by the cap 24 and the main body 20. The electronic components 28 control operation of the motor. The sensed element 32 preferably includes a diametrically magnetized sensor magnet. As will be described further below, the sensor 30 senses rotation of the rotor 14 based on detecting movement of the sensed element 32. According to certain aspects of the present invention, it is permissible for alternative sensing means to be used.

In a preferred embodiment, the controller assembly 18 further preferably includes an electrical connector 33 for connecting electrical wiring 67 to the controller assembly 18. The electrical wiring 67 includes an external wiring connector 39 for connection to external circuitry (not shown). The connector 33 is operable to convey electrical power and/or control signals between the controller assembly 18 and the external circuitry. The control signals may include data related to one or more sensors, data related to controlling operational parameters of the motor 10, and/or other signals for controlling operation of the motor 10. According to some aspects of the present invention, alternative housing cap structures and electrical connection means may be used.

As best shown in FIG. 5, the controller assembly 18 includes openings 72 for receiving fasteners 74. Preferably, the fasteners 74 extend through the openings 72 and threadably engage the cap 24. According to some aspects of the present invention, it is contemplated that the controller assembly 18 and the cap 24 may be interconnected by an alternative means, such as an adhesive, a snap fit, a bolt, a rivet, and/or any other fastening means.

The stator 12 is generally toroidal or annular in form and defines a stator axis that is coaxial with the axis of rotation of the rotor 14. As best illustrated in FIG. 6, the stator 12 preferably includes a stator core 36 that presents a stator base 57 and a plurality of tooth portions 38 extending axially from the base 57. The stator 12 further includes wire windings that form a plurality of coils 34. The stator base 57 presents recesses for receiving inserts 71. The inserts 71 preferably include holes 73 to threadably receive the fasteners 76 for securing the housing base 20 to the stator base 57, as noted above. According to some aspects of the present invention, it is contemplated that the housing base 20 and the stator base 57 may be interconnected by an alternative means, such as an adhesive, a snap fit, a bolt, a rivet, and/or any other fastening means.

As best shown in FIG. 6, the coils 34 are preferably wrapped around respective wire bobbins 80. In the illustrated embodiment, each of the wire bobbins 80 are received by respective ones of the tooth portions 38. The bobbins 80 preferably present an inner perimeter sized to fit around the tooth portions 38. The coils 34 are preferably connected to each other by a combination of series/parallel wire connections. In the illustrated embodiment, twelve (12) bobbins 80, twelve (12) coils 34, and twelve (12) tooth portions 38 are shown. According to certain aspects of the present invention, an alternative number of bobbins, coils, and tooth portions are contemplated.

Figure 7:
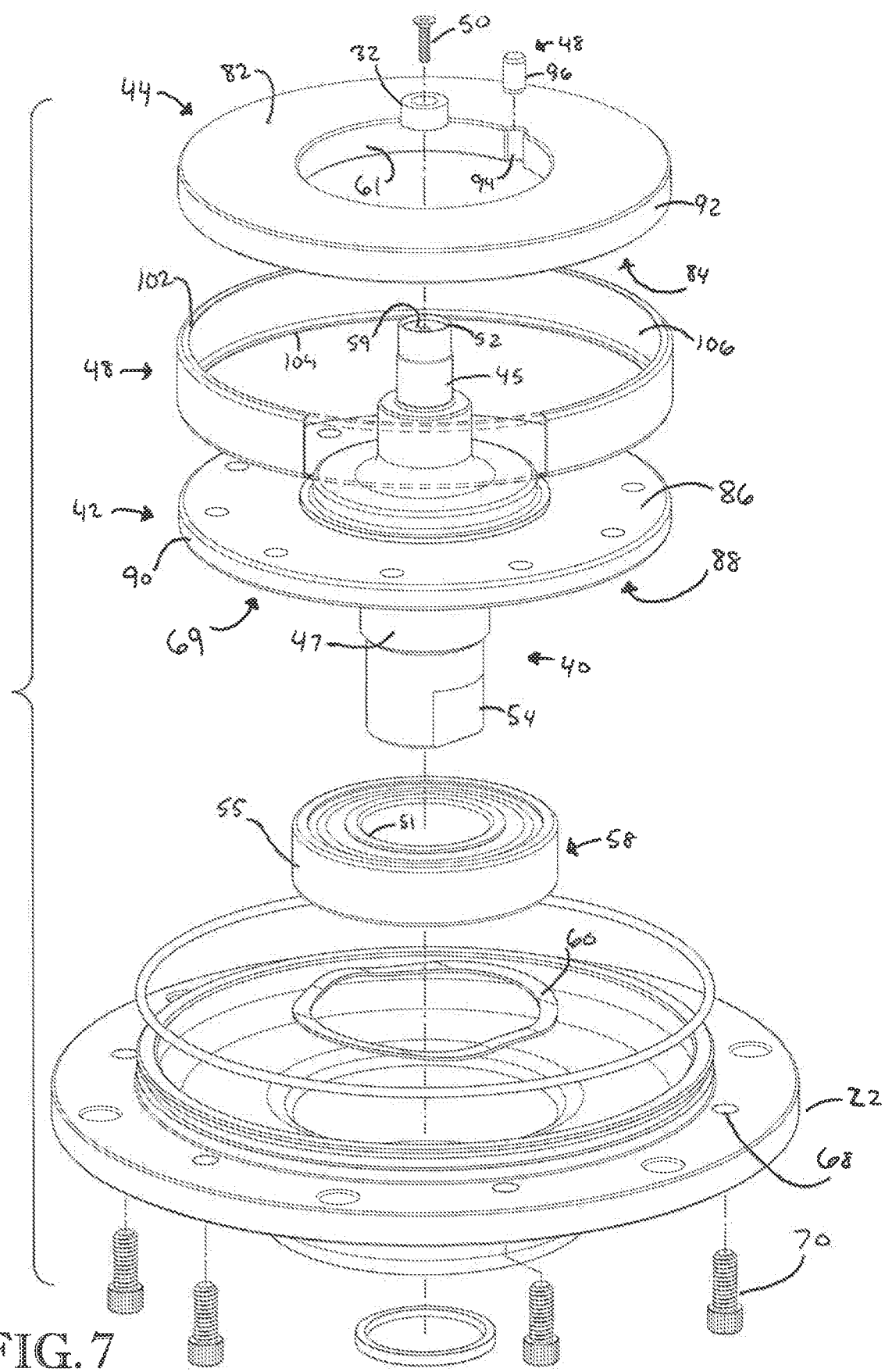
FIG. 7 is an exploded view the rotor and motor housing base of the motor of FIG. 1.

As best shown in FIG. 7, the rotor 14 preferably includes an axial shaft 40, a disc 42, and a ring magnet 44 affixed to the disc 42. In the preferred embodiment, the disc 42 projects radially from the shaft 40. The ring magnet 44 cooperates with the stator 12 to define an axial air gap 46 (shown in FIG. 3). As described further below, a magnetic flux is directed axially through the air gap 46. The design of the axial air gap 46 presents an axial flux motor. However, according to certain aspects of the present invention, radial flux motors are contemplated.

As best shown in FIG. 3, the ring magnet 44 is arranged axially relative to the tooth portions 38 of the stator 12. During operation, the coils 34 are energized by electrical power received from the power connector 37, and the ring magnet 44 rotates relative to the axis of rotation. The rotation of the ring magnet 44 relative to the energized coils 34 induces a magnetic flux through the air gap 46. The axial arrangement of the ring magnet 44 and the tooth portions 38 cause the magnetic flux therebetween to be directed axially through the air gap 46.

The axial shaft 40 preferably includes a lower portion defining a shaft opening 41. The shaft opening 41 is connectable to an external component (not shown) to be rotated, such as a mower blade or blade shaft. According to some aspects of the present invention, alternative means to connect the shaft to the external component are contemplated.

As best shown in FIG. 7, the shaft 40 presents an upper end defining a recess 59. The recess 59 is shaped to complement the sensed element 32 and is preferably cylindrical in shape. The sensed element 32 is preferably received within the recess 59 and affixed to the shaft 40 by a fastener 50. However, according to some aspects of the present invention, alternative means, such as an adhesive, a snap fit, a bolt, a rivet, and/or any other fastening means, for interconnecting the sensed element 32 and the shaft 40 are contemplated. The sensed element 32 is diametrically magnetized and affixed to the shaft 40 such that the sensed element 32 rotates with the shaft 40. The sensor 30 detects the movement of the sensed element 32. The detected movement is communicated by the sensor 30 to other electronic components of the electronic components 28 and used, in part, by the electronics 28 for controlling operation of the motor 10.

As best shown in FIG. 7, the shaft 40 includes opposite axial shaft ends 52, 54. Preferably, the shaft 40 further includes surfaces 45, 47 for engaging bearing assemblies (described below). In the illustrated embodiment, the shaft 40 is rotatably supported relative to the housing 16 by a pair of axially spaced bearing assemblies 56, 58. The disc 42 is preferably equally spaced between spaced between the bearing assemblies 56, 58. However, according to some aspects of the present invention, the disc may be spaced in an alternative manner, such as on a cantilevered portion of the shaft 40.

The bearing assembly 58 is operably engaged by a spring washer 60, which is received within the pocket 43 of the housing base 22. The bearing assembly 56 is operably engaged by retaining ring or spring washer 62 coupled to the housing main body 20. As best shown in FIG. 3, bearing assemblies 56, 58 include respective inner radial perimeters 49, 51 that engage surfaces 45, 47 of the shaft 40, respectively. Bearing assembly 56 further includes an outer radial perimeter 53 that engages and is fixed to the housing body 20 within the pocket 25. Bearing assembly 58 includes an outer radial perimeter 55 that engages and is fixed to the housing base 22 within the pocket 43. Alternative or additional bearing assembly components may be provided without departing from the scope of the present invention, however.

The ring magnet 44 is preferably circular in shape to present a radially innermost circular edge 61 and a radially outermost circular perimeter 92. However, according to some aspects of the present invention, other inner and/or outer circumferential shapes are contemplated.

In the preferred embodiment, the ring magnet 44 is a single magnet having a number of magnetic poles. In the preferred embodiment, the magnet includes twelve (12) poles (not shown), corresponding to the number of coils 34. In an alternative exemplary embodiment, the ring magnet 44 may include eight (8) poles to provide a relatively quick deceleration of the rotor 14. In another alternative exemplary embodiment, the ring magnet 44 may include ten (10) poles to provide a smooth, efficient operation of the motor 10. According to some aspects of the present invention, further alternative numbers of magnetic poles are contemplated.

Figure 8:
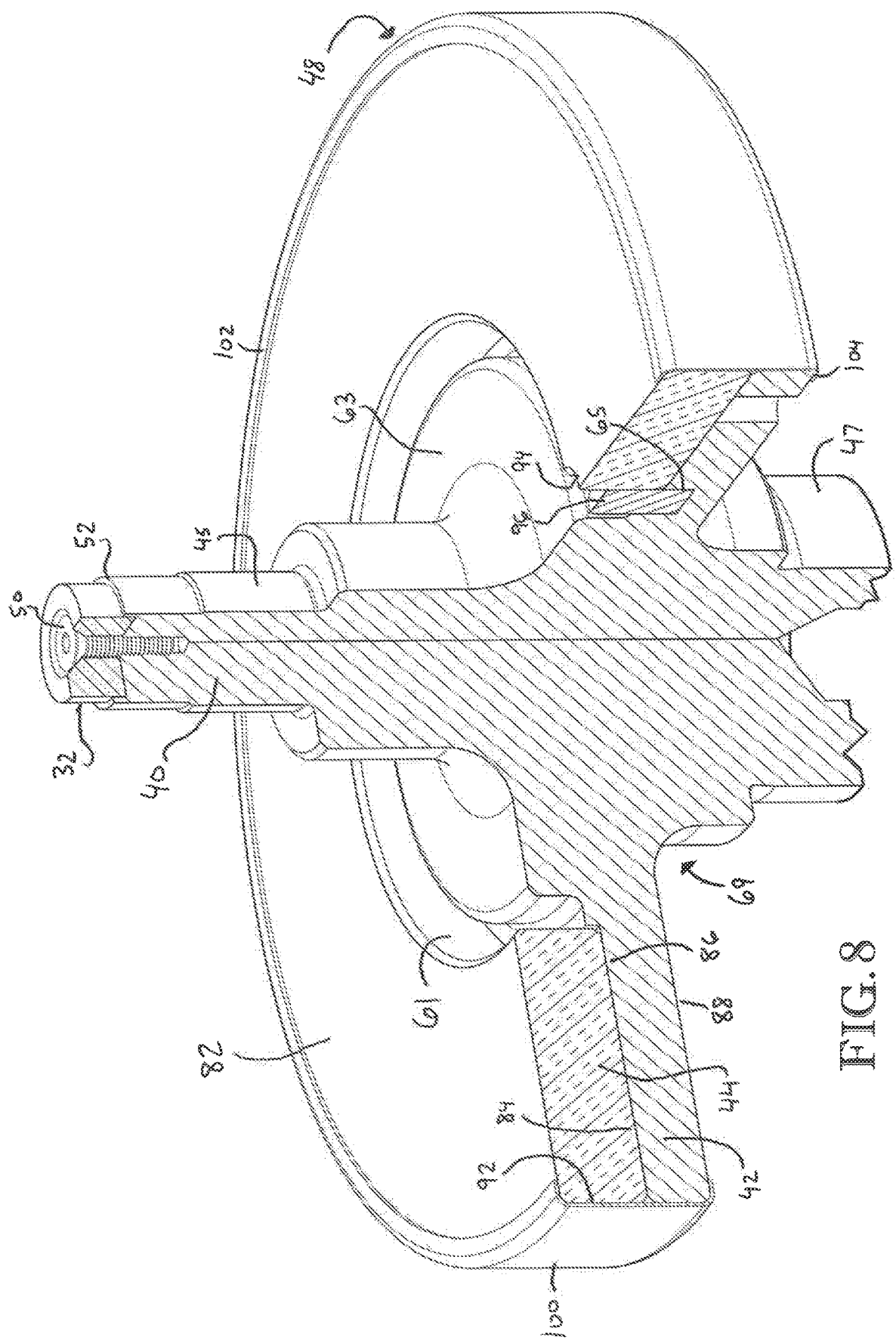
FIG. 8 is a plan-type cross-sectional view of the rotor of the motor of FIG. 1.

In a preferred embodiment, as best shown in FIGS. 7-8, the rotor 14 further includes a magnet retaining structure 48 which serves to secure the ring magnet 44 to the disc 42. The magnet retaining structure 48 is described in detail below.

As best shown in FIG. 7, the ring magnet 44 presents an exposed face 82 and a disc-engaging face 84 axially opposite the exposed face 82. As noted, the stator 12 is axially spaced from and in general alignment with the exposed face 82, thereby presenting the axial air gap 46. The disc-engaging face 84 preferably extends radially from the shaft 40. In a preferred embodiment, the exposed face 82 and the disc-engaging face 84 are substantially planar and arranged substantially parallel in alignment with respect to each other. The exposed face 82 and the disc-engaging face 84 preferably extend radially relative to the shaft 40 in a substantially parallel arrangement. According to some aspects of the present invention, it is contemplated that alternative magnet face structures and arrangements may be used.

In an illustrated embodiment, as best shown in FIG. 7, the disc 42 is circular in shape to present a radially outer disc perimeter 90. However, according to some aspects of the present invention, other disc shapes, such as polygonal, are contemplated. The disc 42 preferably presents a disc radius greater than a radius of the shaft, although according to some aspects of the present invention, alternative disc sizes are contemplated.

The disc 42 preferably includes a central hub 63, as best shown in FIG. 8. The central hub 63 is preferably aligned axially with the ring magnet 44 along the shaft 40. As best shown in FIG. 8, the innermost edge 61 of the ring magnet 44 is preferably spaced from the hub 63. The hub 63 is preferably circular, but could be alternatively shaped and could engage the magnet according to some aspects of the present invention.

As best shown in FIG. 7, the disc 42 presents a magnet-engaging face 86 and a second (or exposed) face 88 axially opposite the magnet-engaging face 86. In a preferred embodiment, the magnet-engaging face 86 and the second face 88 are preferably substantially planar and substantially parallel to each other. The magnet-engaging face 86 and the second face 88 preferably extend radially from the shaft 40. According to some aspects of the present invention, it is contemplated that different disc face arrangements may be used.

Magnet Retaining Structure

In an illustrated embodiment, as best shown in FIGS. 7-8, the rotor 14 further includes a magnet retaining structure 48. The preferred magnet retaining structure 48 broadly includes an adhesive (not shown), a pin 96, and a retaining ring 100. The retaining ring 100 presents lips 102, 104. In a preferred embodiment, the lips 102, 104 are spaced axially relative to each other and extend radially inward towards the shaft 40. The lip 102 engages the ring magnet 44 and the lip 104 engages the disc 42. In the illustrated embodiment, lip 102 engages the exposed magnet face 82 and lip 104 engages the exposed disc face 88.

As best shown in FIG. 8, the disc-engaging face 84 is flatly engaged with the magnet-engaging face 86. In a preferred embodiment, the adhesive (not shown) is applied between the disc-engaging face 84 and the magnet-engaging face 86 to affix the disc-engaging face 84 to the magnet engaging face 84. According to some aspects of the present invention, it is contemplated that alternative means may be used to affix the disc-engaging face to the magnet-engaging face.

In the preferred embodiment, a portion of the innermost edge 61 of the ring magnet 44 defines a notch 94 extending continuously between the exposed face 82 and the disc-engaging face 84. An inner radial portion of the magnet-engaging face 86 of the disc 42 defines a recess 65 that projects axially from the magnet-engaging face 86. The pin 96 is received by the notch 94 and the recess 65 to rotationally affix the ring magnet 44 relative to the disc 42. The pin 96 is also configured to maintain an optimal magnet pole angular position between the ring magnet 44 and the shaft 40. In other words, the pin 96 ensures proper positioning of the ring magnet 44 by establishing and maintaining radial alignment of the notch 94 and the recess 65. According to certain aspects of the present invention, alternative alignments of the notch 94 and the recess 65, such as near the radially outer perimeters of the ring magnet 44 and the disc 42, respectively, are contemplated.

The pin 96 is preferably made from a stainless-steel alloy. More particularly, in a preferred embodiment, the pin 96 is made from 18/8 stainless-steel. According to some aspects of the present invention, alternative non-magnetic pin materials are contemplated.

In a preferred embodiment, the retaining ring 100 is made of a non-magnetic metal material. More specifically, the retaining ring 100 is preferably made from a copper zinc alloy, such as brass. According to some aspects of the present invention, it is permissible for other non-magnetic materials, such as certain stainless-steel alloys, to be used to form the retaining ring 100.

As best shown in FIG. 7, the retaining ring 100 includes an inner surface 106. In a preferred embodiment, the inner surface 106 is circular in shape and continuously engages the disc perimeter 90 and the magnet perimeter 92. In an alternative embodiment (not shown), the retaining ring 100 is not continuous and includes segments that engage the disc perimeter 90 and the magnet perimeter 92 so as to form a non-continuous retaining ring.

It is permissible according to some aspects of the present invention for the retaining ring 100 to be alternatively configured (either continuously or non-continuously) or omitted entirely. According to certain aspects of the present invention, the ring 100 need not engage the disc perimeter 90 and the magnet perimeter 92. For example, an alternative embodiment may include radially intermediate surfaces of the disc 42 and the magnet 44 engaged by the retaining ring 100. In another example, according to some aspects of the present invention, the retaining ring 100 may only have one lip. In a further example, the retaining ring 100 may have no lips and may be affixed to the ring magnet 44 and the disc 42 by an adhesive.

Unitary Rotor Body

In a preferred embodiment, as best shown in FIGS. 7-8, the shaft 40 and the disc 42 are forged together to form a unitary rotor body 69. It is permissible, according to certain aspects of the present invention, that a means other than forging may be used to form the unitary rotor body 69. Other unitary bodies may include other high strength metals, carbon fiber, or other synthetic materials. The unitary rotor body 69 is described in greater detail below.

It is noted that certain American National Standards Institute (ANSI) standards, such as ANSI B71-1 and ANSI B71-4, specify electric motors to withstand an abrupt stoppage of motor rotation without catastrophic failure of the motor and related parts, such as a blade of a lawn mower. When an abrupt stoppage event occurs, the motor must withstand a high deceleration torque and other stresses associated with a catastrophic failure. The preferred ring magnet 44 and the magnet retaining structure 48 provide additional structural integrity. The ring magnet 44 presents all of the magnetic poles in a single piece, preventing the possibility of individual magnets becoming dislodged. The preferred magnet retaining structure 48 affixes the ring magnet 44 to the disc 42 such that the disc 42 and the ring magnet 42 are not easily separated, even under harsh conditions.

The shaft 40 and the disc 42 of the rotor 14 being forged together as the unitary body 69 provides a greater durability of the rotor 14 relative to other rotors comprising multiple discrete elements. In an exemplary embodiment, the unitary rotor body 69 is capable of withstanding an abrupt stoppage event at least one (1) time without failure. In a preferred embodiment, the unitary rotor body 69 is capable of withstanding an abrupt stoppage event at least five (5) times without failure. Furthermore, the integrated nature of the unitary rotor body 69 further provides an increased power density per total axial length of the motor 10 compared to existing axial flux motors. The increased power density per total axial length allows for a relatively high amount of torque to be applied to the motor 10 without catastrophic failure.

In some conventional electric motors, an axial alignment of the shaft can drift over time relative to the bearings. This drift may be caused by loose mechanical couplings between the shaft and other components of the rotor and lead to unwanted variations in rotor axial alignment when the motor is in use. The integrated nature of the shaft 40 and the disc 42 minimizes and/or prevents such fluctuations in the axial positioning of the shaft 40 relative to the bearing assemblies 56, 58. As a result of the shaft 40 and the disc 42 being integrated into the unitary body 69, the rotor 14 provides a consistent rotor axial location relative to the bearing assemblies 56, 58. The configuration of the pin 96 being received by the disc 42 and the magnet 44 further prevents variations in rotor alignment, by maintaining the respective rotational positions of the magnetic poles of the ring magnet 44 relative to the disc 42.

Furthermore, by minimizing axial positioning fluctuations of the rotor 14, a consistent magnetic field is induced in the gap 46. The consistent magnetic field provides an improved conversion efficiency compared to existing axial flux motors.

Conclusion

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

Having thus described one or more embodiments of the invention, what is claimed as new and desired to be protected by Letters Patent includes the following:

1. An electric motor comprising:
a stator;
a rotor rotatable relative to the stator,
said rotor including an axial shaft, a disc projecting radially from the shaft, and a ring magnet affixed to the disc,
said shaft and said disc being integrally formed as a unitary body,
said ring magnet presenting a radially outer magnet perimeter,
said disc presenting a radially outer disc perimeter; and
a retaining ring engaging the ring magnet and disc perimeters to affix the ring magnet to the disc,
said retaining ring including a pair of axially spaced radially inward extending lips, a first one of which engages the ring magnet and a second one of which engages the disc.

2. The electric motor of claim 1,
said ring magnet and said stator defining an axial air gap,
said ring magnet and said stator being arranged such that magnetic flux therebetween is directed axially through the air gap.

3. The electric motor of claim 1,
said shaft presenting axially opposite shaft ends,
said disc being spaced between the ends.

4. The electric motor of claim 1, further comprising:
a motor housing defining a motor chamber,
said motor chamber at least partly receiving said stator and said rotor; and
a pair of axially spaced bearing assemblies rotatably supporting the shaft relative to the housing,
said disc being spaced between the bearing assemblies.

5. The electric motor of claim 1,
said ring magnet presenting a radially extending disc-engaging face,
said disc presenting a magnet-engaging face,
said magnet-engaging face engaging the disc-engaging face.

6. The electric motor of claim 5, further comprising:
an adhesive between the disc-engaging face and the magnet-engaging face to affix the ring magnet to the disc.

7. The electric motor of claim 6,
said disc-engaging face and said magnet-engaging face being substantially planar so as to flatly engage one another.

8. The electric motor of claim 7,
said ring magnet presenting an exposed face axially opposite the disc-engaging face,
said exposed face and said disc-engaging face being substantially flat and parallel.

9. The electric motor of claim 8,
said stator being spaced axially from and in general radial alignment with the exposed face.

10. The electric motor of claim 8,
said disc presenting a second face axially opposite the magnet-engaging face,
said second face and said magnet-engaging face being substantially flat and parallel.

11. The electric motor of claim 1,
said retaining ring extending continuously about the ring magnet and disc perimeters.

12. The electric motor of claim 11,
said ring magnet and disc perimeters being radially aligned,
said retaining ring presenting an inner surface engaging the ring magnet and disc perimeters.

13. The electric motor of claim 12,
said ring magnet and disc perimeters each being circular in shape,
said inner surface of the retaining ring being circular in shape so as to continuously engage the ring magnet and disc perimeters.

14. The electric motor of claim 1,
said ring magnet and disc presenting exposed axially opposite magnet and disc faces, respectively,
said first one of the lips engaging the exposed magnet face,
said second one of the lips engaging the exposed disc face.

15. The electric motor of claim 14,
said ring magnet presenting a disc-engaging face axially opposite the exposed magnet face,
said disc presenting a magnet-engaging face axially opposite the exposed disc face,
said magnet-engaging face engaging the disc-engaging face.

16. The electric motor of claim 15, further comprising:
an adhesive between the disc-engaging face and the magnet-engaging face to affix the ring magnet to the disc.

17. The electric motor of claim 1,
said shaft and said disc being forged together to form said unitary body.

* * * * *